Feb. 8, 1927.
G. S. MERWIN
1,617,020
LIQUID SAVING, REPLENISHING, AND AIR BLEEDING MECHANISM FOR HYDRAULIC BRAKES
Filed June 15, 1925
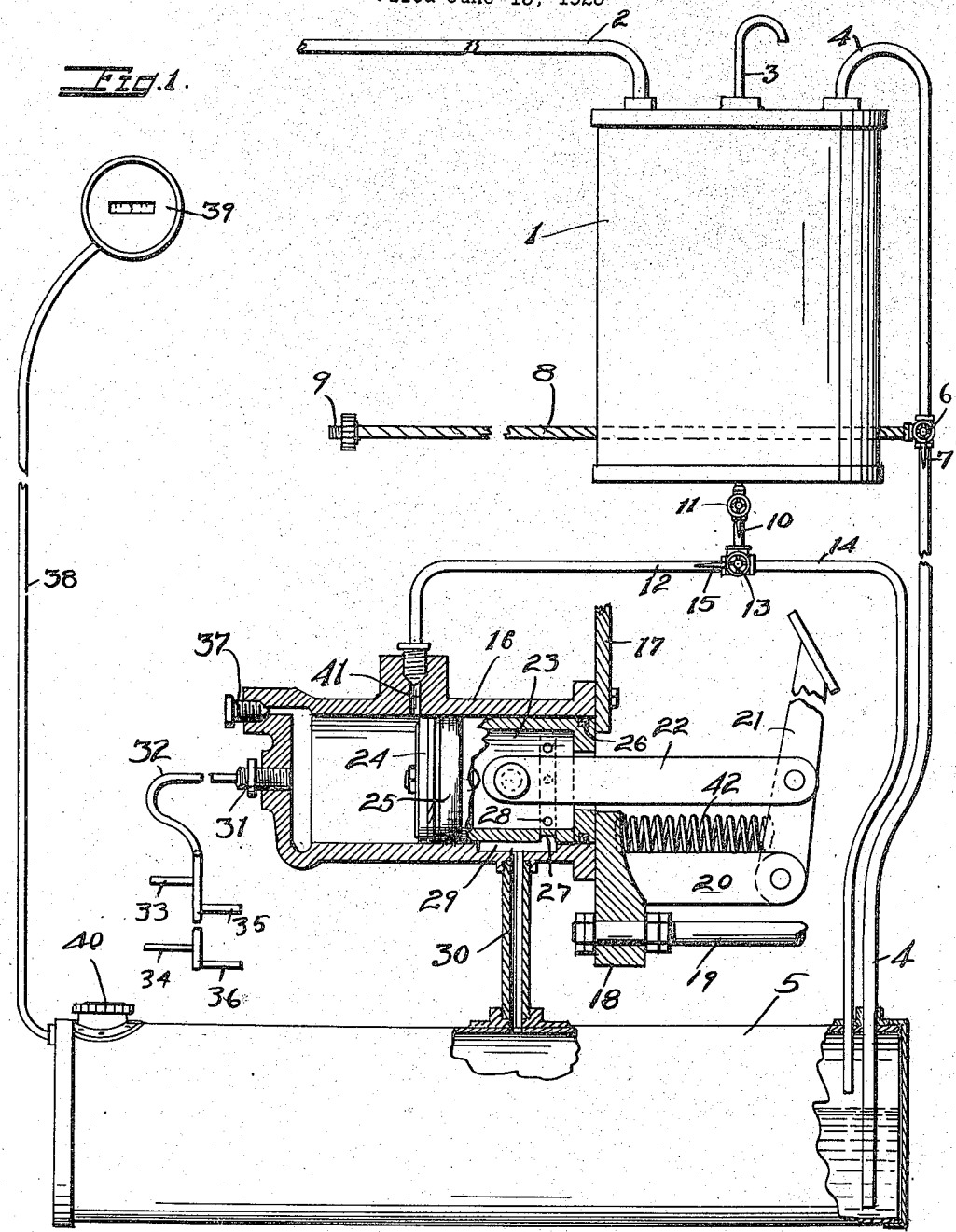
INVENTOR.
George S. Merwin.
BY Carlos P. Griffin
ATTORNEY.

Patented Feb. 8, 1927.

1,617,020

UNITED STATES PATENT OFFICE.

GEORGE S. MERWIN, OF SAN FRANCISCO, CALIFORNIA.

LIQUID SAVING, REPLENISHING, AND AIR-BLEEDING MECHANISM FOR HYDRAULIC BRAKES.

Application filed June 15, 1925. Serial No. 37,008.

This invention relates to a mechanism for saving the liquid lost from the ordinary hydraulic brake liquid compression cylinder in combination with means for replenishing the liquid supply, and for removing any air from the liquid in the brake system.

It will be understood by those familiar with the hydraulic brake commonly used on automobiles, that a moderately small quantity of fluid is used in the braking mechanism, and that if any of the liquid is lost that it interferes with the use and application of the brakes, so that an object of the present invention is to provide means whereby the liquid that escapes from the pressure cylinder will drain back into a storage receptacle, from which storage receptacle the liquid is returned by an ordinary form of vacuum feed to an elevation high enough above the pressure cylinder to keep it full at all times.

It will also be seen that the vacuum feed provides the means whereby the oil used in the braking system can be pumped out of the braking system and into the vacuum feeder, and thereby take any air that is in the brake system out of it, replacing it with oil.

Other objects of the invention will appear as the description proceeds.

An embodiment of the invention is shown in the accompanying drawings, in which the same reference numeral is applied to the same portion throughout, but I am aware that there may be modifications thereof.

Fig. 1 is a diagrammatic side elevation of the apparatus, the brake pressure cylinder being shown in vertical section, and a portion of the liquid supply tank being shown in section.

Fig. 2 is a vertical sectional view of a modified form of plunger showing the detail of its construction.

The numeral 1 represents a well known form of vacuum liquid feeder, in which the pipe 2 extends to the intake manifold of an explosion engine to provide the feeder with the vacuum necessary for its operation; 3 indicates the air vent pipe for said feeder, and 4 the liquid supply pipe, which pipe extends substantially to the bottom of the liquid reservoir 5, said reservoir ordinarily containing a gallon or two of the liquid used on the brake system.

The pipe 4 is provided with a three-way valve plug 6, which has the pointer 7 arranged so that either the lower portion of the pipe 4, or the flexible tubing 8 will be connected with the upper portion of the pipe 4, according to the position of the indicator 7.

The flexible tube has a screw fitting 9, which enables it to be connected with any one of the air bleeding plugs on the entire system as will be later explained.

At the bottom of the vacuum feeder there is a pipe 10, having a cut-off valve 11, which is connected to the three-way valve 13, in turn connected to the pipe 12 and pipe 14. The valve plug 13 has an indicating hand 15, which indicates by its position whether the pipe 12 will receive liquid or whether it will run into the pipe 14, for an object to be presently explained.

The pipe 14 extends into the tank 5, a short distance, for the purpose of delivering some fluid from the vacuum feeder tank 1 to the reservoir tank 5 when the brake system is to be relieved of air.

The brake cylinder is indicated at 16, and it is secured to suitable fixed flanges 17 and 18 on the vehicle frame which flanges are held in a fixed position by means of the rod 19.

The flange 18 has an arm 20, which pivotally supports the brake pedal 21, which pedal is in turn pivotally connected to the link 22, pivotally connected to the piston 23.

The piston 23 has two rings, 24, an ordinary cast iron piston ring, and 25, a common cup leather, and a felt wiper ring 26. It is also provided with a groove 27, extending part way around it, which groove has holes 28 into the interior of the piston to allow any fluid that may collect therein to drain through the recess 29 in the bottom of the cylinder. The ring 24 takes the initial pressure until the cup leather gets past the port 41, and thereby prevents it from being cut by the port edges.

A pipe 30 connects the bottom of the cylinder 16 with the reservoir 5. A screw plug 31 is connected to the pipe 32, which has branches 33 to 36 inclusive, extending to the brake cylinders of each of the several wheels of the vehicle.

In addition the cylinder has a small plug 37, which plug is internally threaded to receive the fitting 9, and which when unseated allows the fluid within the cylinder 16 to be pumped through the pipe 4 into the receptacle 1.

In order to provide visible means for determining the liquid supply in the tank 5, there is a tube 38, which has a dash indicator 39 in convenient view of the driver.

The reservoir has a suitable screw cap 40, which is not sufficiently air tight to prevent the circulation of fluid as may be required in the system.

The operation of the apparatus is as follows: It will be seen that the pipe 12 is connected to a boss in the cylinder 16, which has a hole 41 extending into said cylinder immediately in advance of the piston, so that a very slight movement of the piston will serve to cut-off the escape of fluid through the hole 41, and will put whatever pressure is applied to the piston on the line 32, and thereby on the line extending to the several brakes on the vehicle.

Should any liquid leak past the piston ring 24, and leather 25, it will be stopped by the groove 27, and will run out through the recess 29, and pipe 30, into the tank 5.

Since the vacuum feeder 1 is connected to the manifold on the engine, whatever oil or liquid is lost by the cylinder 16, will be restored thereto, because the spring 42 always restores the piston to the back end of the cylinder as shown in the figure, and if any liquid has been lost, it will be immediately replenished.

Since the vacuum liquid feeder 1 is ready for operation continuously, it maintains the supply of liquid the same as the supply of gasoline is maintained for use in the carburetter of an engine. Should the user find that the brakes do not work properly, he may suspect that a quantity of air has been, in some manner, injected into the braking system, and he will then desire to remove the same. This is done by turning the indicator 7 in line with the pipe 8, and then turning the indicator 15 in line with the pipe 14, until the suction, which can be detected with the aid of the finger at the fitting 9, is supplied to the pipe 8, thereupon the pointer 15, is again turned in line with the pipe 12, and the engine will continue to apply the vacuum to the pipe 8 as long as desired. When this is done the fitting 9 is applied to the plug 37, or to any of the other bleeder plugs of the braking system, and this will cause the fluid used in the braking system to be withdrawn therefrom and continuously replenished by the feeder tank 1, and, of course, whatever air is found in the liquid will pass off to the engine through the pipe 2, and this circulation can be continued for such a length of time as the user decides is necessary.

In the form of the piston shown in Fig. 2, the cylinder is indicated at 16, the brake link at 22, and the piston proper at 43.

This piston has the groove 44, the same as the other piston, as well as the felt wiper ring 45.

In order to hold the piston ring 46, and the cup leather 56, there is a follower block 48 secured to the bottom of the piston 43, by means of a bolt 49. This bolt also passes through a spring expanding plate 47, which holds the cup leather expanded tightly against the cylinder 16. This cylinder has the recess 29, the same as the other cylinder, as well as the hole to receive the pipe 30.

What I claim is as follows, but modifications may be made in carrying out the invention shown in the drawings, and in the above particularly described form thereof, within the purview of the claims herein.

1. A hydraulic brake system comprising a pressure cylinder, a piston therein, means for operating said piston to cause the fluid therein to pass under pressure to the several brakes of the car, a receiving receptacle for liquid lost from the pressure cylinder, connected to said cylinder, a fluid receptacle above the brake cylinder and means to raise the lost liquid to the fluid supply above the cylinder to replenish any liquid lost from said pressure cylinder.

2. A hydraulic brake system comprising a pressure cylinder, a piston therein to cause the liquid contained within the cylinder to be forced to the several brakes to be operated thereby, a liquid receiving reservoir connected to said cylinder to collect any liquid lost by the piston, and means to continuously maintain from said reservoir at an elevation above the cylinder a supply of liquid to replenish any loss therefrom.

3. In a hydraulic brake system a pressure cylinder, a piston therein, means to cause the piston to expel the liquid therein to operate the several brakes of a car, a receiving receptacle connected to the cylinder to collect any liquid lost by the piston, and means to continuously maintain a supply of the liquid at an elevation above the pressure cylinder, whereby any loss from the cylinder is continuously maintained when the piston is at rest, said means also serving to continuously remove surplus air from the brake system.

4. In a hydraulic brake system, a brake cylinder, a piston therein, means to operate the piston to cause it to deliver liquid to the several brakes of a car, a receiving receptacle connected with the cylinder to collect any fluid lost by the piston, and means to continuously maintain a supply of fluid from said receptacle at an elevation at a level above the cylinder, whereby any loss therefrom is continuously made good, said means to continuously remove surplus air from the system.

5. A hydraulic brake system comprising a pressure cylinder having connections extending to the several brakes of a car, a piston in the cylinder, means to operate said piston to cause the fluid therein to flow under pressure to the several brakes, a fluid supply tank having a connection extending to the cylinder to permit any fluid passing the piston to collect in said supply tank, a vaccum supply tank connected to the first supply tank adapted to maintain a supply of liquid in the cylinder, and pipe connections whereby the suction within the vacuum supply tank may be used to circulate the liquid in the brake system to remove air therefrom.

6. A hydraulic brake mechanism comprising a pressure cylinder having connections extending to the several brakes of a car, means for causing the fluid within the cylinder to flow under pressure to the several brakes, a fluid supply tank, a vacuum supply tank connected with the fluid supply tank adapted to maintain a supply of fluid from the supply tank into the cylinder, and pipe connections whereby the suction within the vacuum supply tank may be used to circulate the liquid in the brake system to remove air therefrom.

7. In a hydraulic brake system, a brake cylinder adapted to receive fluid, means for acting on the fluid within the cylinder to deliver the same to the several brakes of a car, a receptacle connected with the cylinder, and pressure means to continuously maintain a supply of fluid from said receptacle at a level above the cylinder whereby any fluid loss from the system is continuously replenished, said means also serving to remove surplus air from the brake system.

8. A hydraulic brake system comprising a fluid containing pressure cylinder having connections extending to the several brakes of a car, a piston in the cylinder, means to operate the piston to cause the fluid therein to flow under pressure to the several brakes, a fluid supply tank, a vacuum supply tank connected with the first supply tank and adapted to maintain the supply of fluid in the cylinder, and pipe connections whereby the suction within the vacuum supply tank may be used to circulate the liquid in the brake system to remove air therefrom.

In testimony whereof I have hereunto set my hand this 6th day of June A. D. 1925.

GEORGE S. MERWIN.